(12) United States Patent
Kliger et al.

(10) Patent No.: US 8,848,733 B2
(45) Date of Patent: Sep. 30, 2014

(54) DUAL CHANNEL MODE OF OPERATION FOR BONDED CHANNELS

(75) Inventors: Avi Kliger, Ramat Gan (IL); Yitshak Ohana, Givat Zeev (IL)

(73) Assignee: Broadcom Corporation, Irvine, CA (US)

(*) Notice: Subject to any disclaimer, the term of this patent is extended or adjusted under 35 U.S.C. 154(b) by 120 days.

(21) Appl. No.: 13/458,433

(22) Filed: Apr. 27, 2012

(65) Prior Publication Data
US 2013/0287042 A1   Oct. 31, 2013

(51) Int. Cl.
*H04L 29/06*   (2006.01)
(52) U.S. Cl.
USPC .......................................... 370/464
(58) Field of Classification Search
CPC ...................................... H04L 29/06
USPC ............................................ 370/464; 398/25
See application file for complete search history.

(56) References Cited

U.S. PATENT DOCUMENTS

| | | | |
|---|---|---|---|
| 2010/0091664 A1* | 4/2010 | Nandy et al. | 370/242 |
| 2012/0169831 A1* | 7/2012 | Nietfeld et al. | 348/14.08 |
| 2012/0198315 A1* | 8/2012 | Soliman et al. | 714/786 |
| 2013/0071105 A1* | 3/2013 | Chang | 398/25 |

FOREIGN PATENT DOCUMENTS

| | | |
|---|---|---|
| KR | 10-2009-0121327 | 11/2009 |
| KR | 10-2010-0071494 | 6/2010 |

* cited by examiner

*Primary Examiner* — Wei Zhao
(74) *Attorney, Agent, or Firm* — Brinks Gilson & Lione (57) ABSTRACT

A dual channel mode of operation (DCM) for a home entertainment network that can provide aggregate throughput associated with channel bonding without requiring that every device in the network be capable of channel bonding.

19 Claims, 10 Drawing Sheets

DUAL CHANNEL MODE OF OPERATION FOR BONDED CHANNELS

TECHNICAL FIELD

The disclosure relates to network protocols. The disclosure also relates to a protocol for communication of audio and video streams over coaxial cables.

BACKGROUND

The home networking industry is experiencing rapid growth in network technology. Home entertainment operators and network device manufactures are searching for new solutions to be implemented into home networks to provide broader bandwidth, better quality, and new services, such as multi-room DVR, personal and over-the-top content sharing, and Internet Protocol television applications. For example, networking standards ratified by the Multimedia over Coax Alliance (MoCA) can be considered a promising solution for providing home networks. The MoCA 2.0 specification for home networking over coax cables may at least support a data transfer rate up to 400 Mbit/s, channel-bonding, and point-to-point applications.

BRIEF DESCRIPTION OF THE DRAWINGS

The system can be better understood with reference to the following drawings and description. In the figures, like reference numerals designate corresponding parts throughout the different views.

DETAILED DESCRIPTION

The discussion below provides a dual channel mode of operation (DCM) for a home entertainment network that can provide aggregate throughput associated with channel bonding without requiring that every device in the network be capable of channel bonding. However, where a device is not capable of channel bonding, this device can be readily updated via software or firmware to be capable of the DCM. Therefore, once nodes in such a network are updated with such software or firmware that support DCM, the network can provide aggregate throughput associated with networks where all nodes are capable of channel bonding. Whereas in other channel bonding environments or modes of operation, nodes that are not capable of channel bonding can reduce aggregate throughput. Further, in such other environments or modes of operation, the nodes not capable of channel bonding cannot be easily updated to remedy their discrepancy, so they can be replaced or left to limit the aggregate throughput of the network.

For example, a current version of a MoCA network that supports channel bonding, e.g., MoCA 2.0, implementing DCM can provide aggregate throughput associated with channel bonding without requiring that devices in the network be a MoCA device capable of channel bonding as long as there are some devices in the network capable of channel bonding. Therefore, an earlier version of a MoCA device, e.g., MoCA 1.1 device or a MoCA 2.0 single channel device (a MoCA 2.0 device that is not capable of channel bonding), which is not capable of channel bonding, can be readily updated via software or firmware to become capable of channel bonding in the DCM. Therefore, once earlier version MoCA devices in such a network implementing DCM are updated with such software or firmware, the MoCA network can provide aggregate throughput associated with networks where clients are current MoCA devices capable of channel bonding. Whereas in other MoCA networks not implementing the DCM, earlier version MoCA devices can reduce aggregate throughput compared to current version devices because they cannot implement channel bonding. Further, in such other MoCA networks, the earlier version MoCA clients cannot be easily updated to remedy their discrepancy, so they are replaced or left to limit the aggregate throughput of the current version MoCA network.

Figure 1:
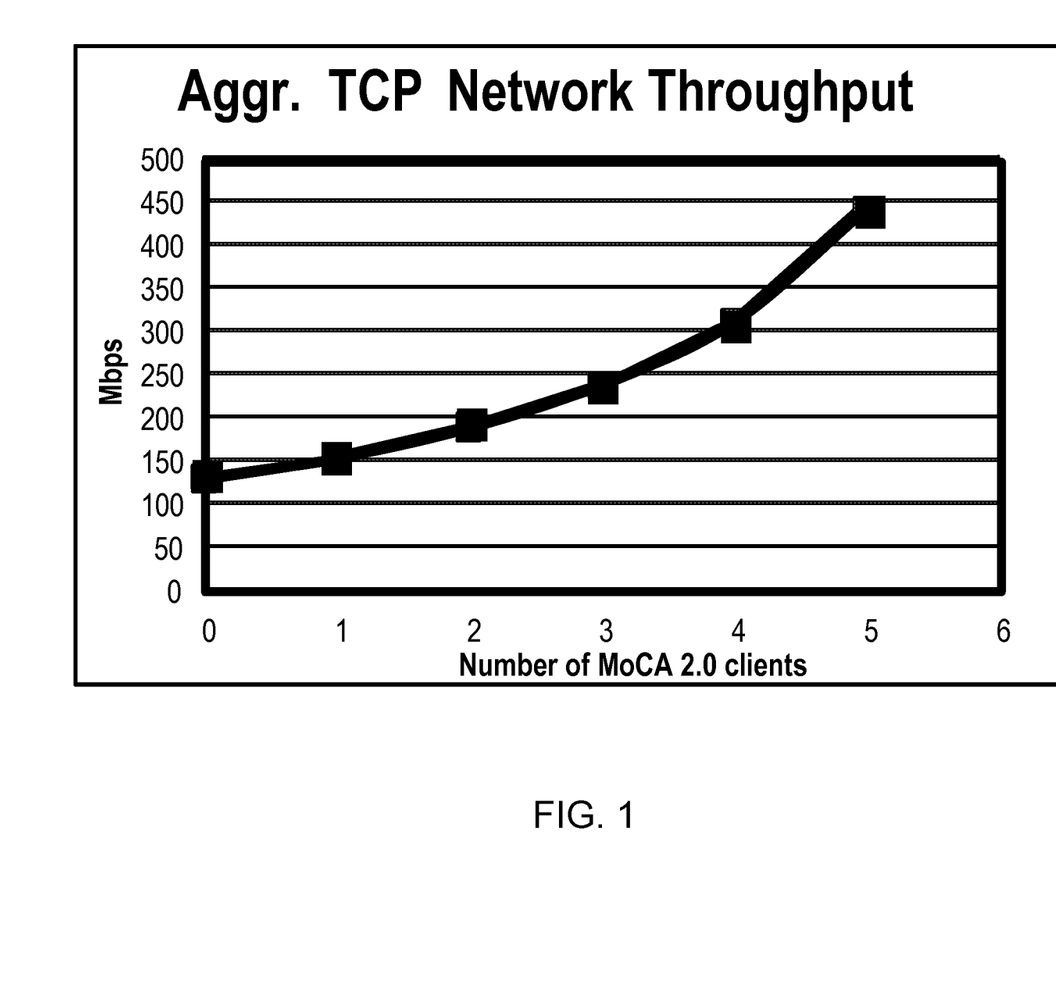
FIG. 1 is a graph showing example aggregate TCP network throughput with respect to an amount of MoCA nodes.
Figure 2:
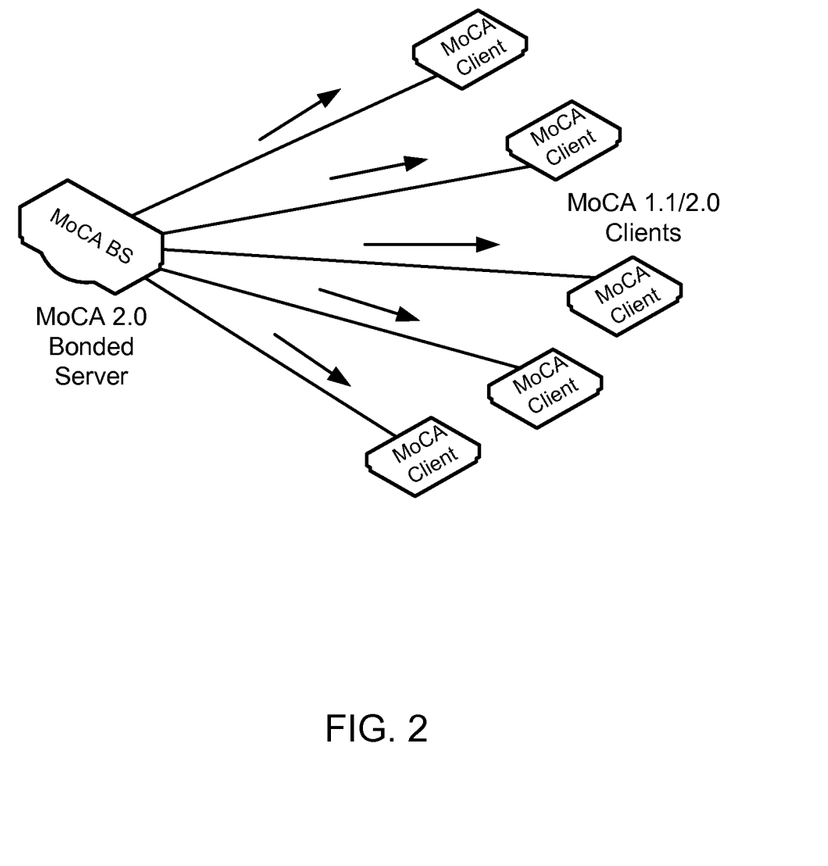
FIG. 2 is a block diagram of an example MoCA network.

In FIG. 1, depicted is a graph showing aggregate TCP network throughput with respect to an amount of MoCA clients capable of channel bonding. The graph represents network topologies with a single MoCA server capable of channel bonding and a plurality of clients, e.g., five clients as shown if FIG. 2, that are not capable of channel bonding. In the graph the aggregate TCP network throughput decreases with an increase in number of current version MoCA clients. This may not be the case where such networks utilize the DCM, and the MoCA clients not capable of channel bonding have been updated via software or firmware to be capable of DCM.

In general, the DCM, which can be a MoCA dual channel mode, e.g., a MoCA 2.0 dual channel mode, is a mode of operation in which at least three different Nodes are communicating simultaneously with one or two transmitter nodes and one or two receiver nodes. The DCM provides simultaneous transmission over two channels, such as MoCA dual channel mode primary and secondary channels. The DCM can provide simultaneous transmission between two channels, such as providing simultaneous transmission between two MoCA bonded channels. Also, DCM can provide simultaneous transmissions between a bonded channels enabled node and two single channel nodes using the two channels, such as communications between a pair of MoCA single channel nodes and a MoCA bonded node. Further, DCM can provide simultaneous transmissions between two pairs of single channel nodes, such as two pairs of MoCA single channel nodes. The DCM can also provide a dual channel mode of operation where a single transmitter node transmits on the two channels (DCMB-TX) or a single receiver node receives on the two channels (DCMB-RX). The DCM can also provide for two different transmission nodes and two different receiver nodes to communicate simultaneously on the two channels (DCMS).

For a network to exploit these features, a network controller is a DCM enabled network node; however other nodes do not need to be DCM enabled. For example, in a DCM enabled MoCA network, MoCA 1.1 and MoCA 2.0 with no DCM support, can coexist in the DCM enabled MoCA network without performance degradation. To clarify, a capable DCM node includes a node capable of operating in a DCM mode as either a node capable of bonded channels communication or a node capable of single channel communication.

Figure 3:
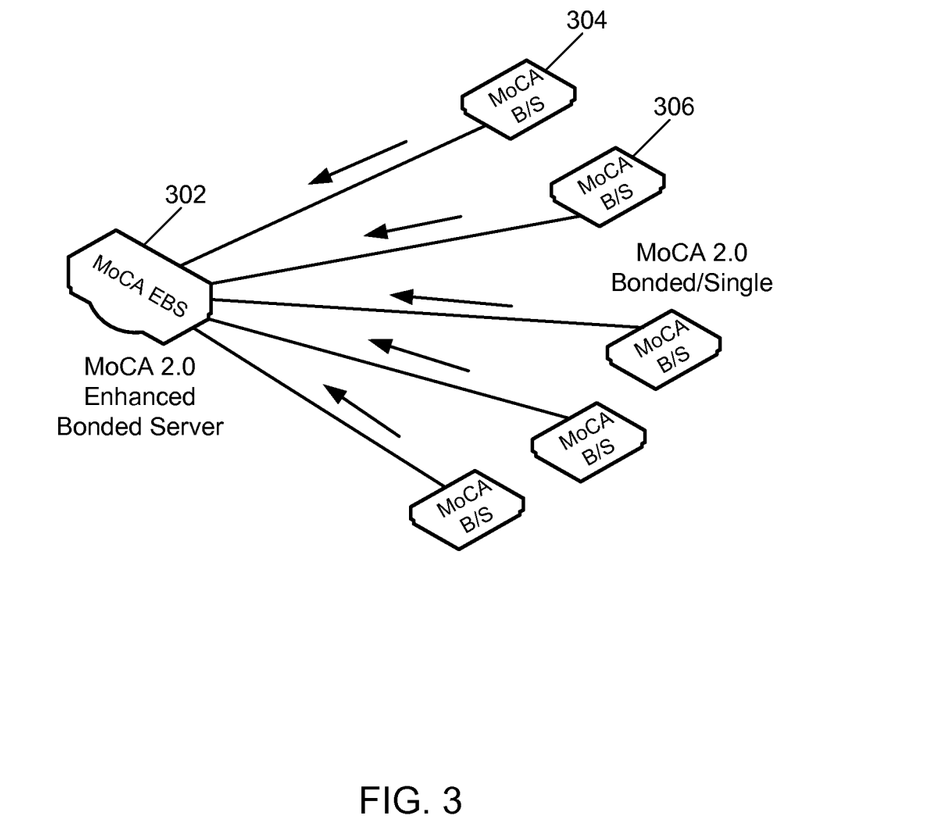
FIG. 3 is a block diagram of an example MoCA network operating in a dual channel mode (DCM) where a single receiver node is receiving on two channels (DCMB-RX).

FIG. 3 is a block diagram of an example network 300 operating in the DCM where a single DCM enabled receiver node 302 is receiving transmissions on two channels simultaneously from two transmitter nodes 304 and 306 (DCMB-RX). In some embodiments, the network 300 can be a MoCA network, the single receiver node 302 can be a MoCA enhanced bonded server, and the two transmitter nodes 304 and 306 can be two MoCA single-channel devices, two MoCA multiple-channel devices, or a combination thereof. For example, a DCM enabled set top box can receive multimedia transmissions from two different servers, or a DCM enabled server can receive transmissions from two different clients, simultaneously. In other implementations more than two channels can be used.

Figure 4:
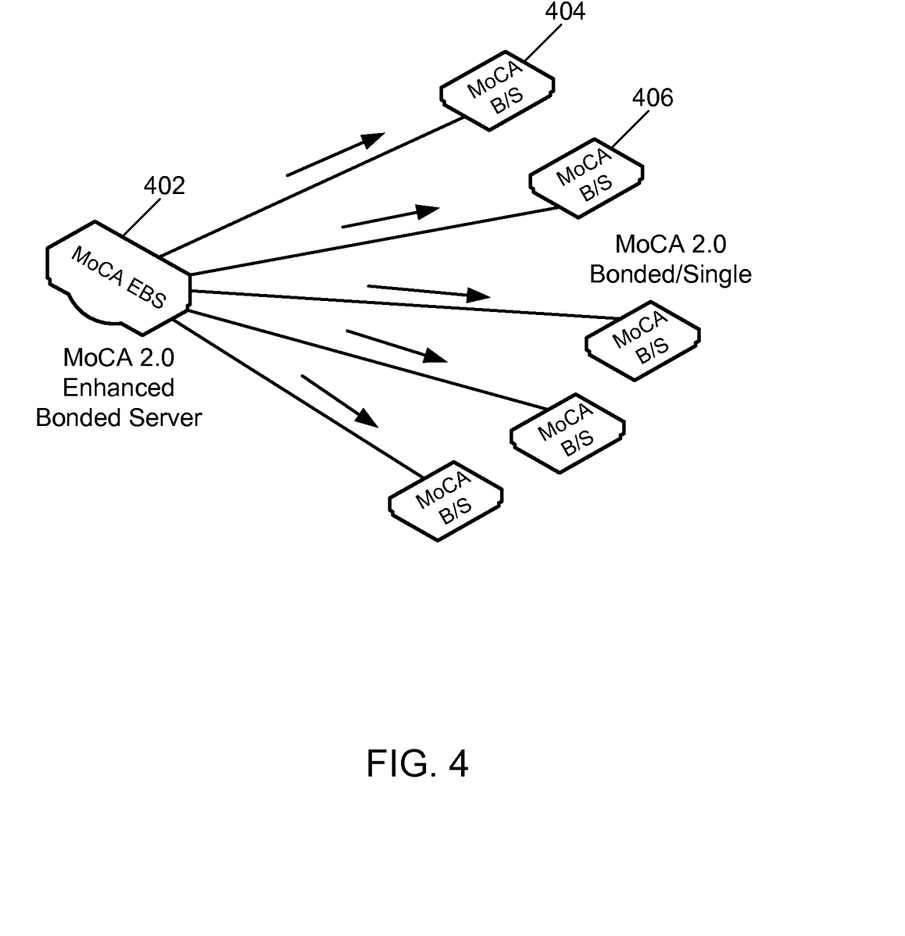
FIG. 4 is a block diagram of an example MoCA network operating in a DCM where a single transmitter node is transmitting on two channels (DCMB-TX).

FIG. 4 is a block diagram of an example network 400 operating in the DCM where a single DCM enabled transmitter node 402 is transmitting transmissions on two channels simultaneously to two receiver nodes 404 and 406 (DCMB-TX). In some embodiments, the network 400 can be a MoCA network, the single transmitter node 402 can be a MoCA enhanced bonded server, and the two receiver nodes 404 and 406 can be two MoCA single-channel devices, two MoCA multiple-channel devices, or a combination thereof. For example, a DCM enabled set top box can transmit multimedia transmissions to two different boxes, or a DCM enabled server can transmit such transmissions to two different clients, simultaneously. Also, a DCM enabled multimedia server can distribute multimedia streams to two different set top boxes simultaneously.

Figure 5:
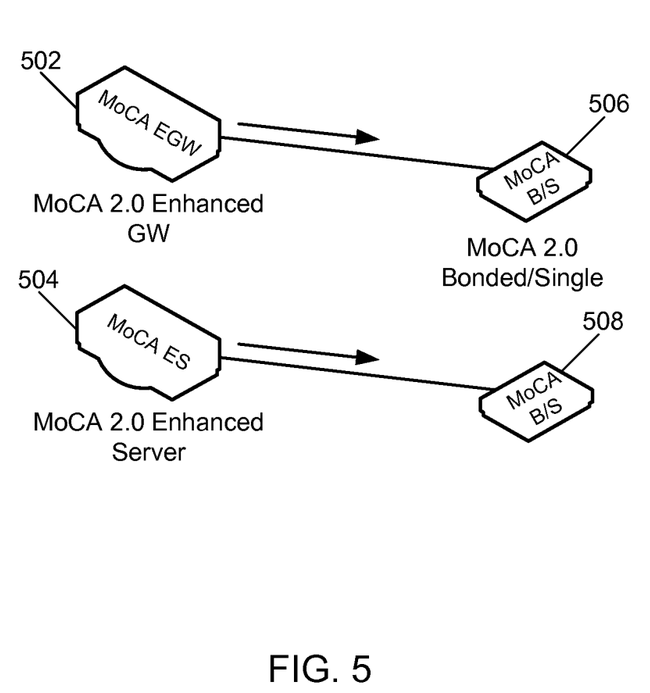
FIG. 5 is a block diagram of an example MoCA network operating in a DCM where two respective transmitter nodes and two respective receiver nodes are simultaneously transmitting and receiving on two respective channels (DCMS).

FIG. 5 is a block diagram of an example network 500 operating in the DCM where two respective transmitter nodes 502 and 504 and two respective receiver nodes 506 and 508 are simultaneously transmitting and receiving on two respective channels (DCMS). In the DCMS the transmitter nodes 502 and 504 or the receiver nodes 506 and 508 are DCM enabled. Like the DCMB-RX and -TX modes, the DCMS increases network throughput.

Although the DCM increases network throughput, there may be tradeoffs associated with communicating on bonded channels. One of these tradeoffs may be the secondary channel interfering with the primary channel. From this perspective, the primary channel communicates a desired signal, such as a DCM signal to be received by a receiving DCM node. The secondary channel communicates an interferer, which is a signal transmitted on an adjacent channel to the desired signal in parallel. Also, the interferer can be from a same transmitting DCM node as the node transmitting the desired signal. To compensate for the interferer's distortion of the desired signal, the DCM measures signal-to-noise ratio (SNR) from previous probe transmissions. However, because the SNR is based on historical data it can be inaccurate to various degrees, as the state of the different nodes and interfaces to the media may change during actual data transmissions, and may be different from their state during the probe transmissions.

In some embodiments, the DCM features tools to compensate for inaccurate SNR measurements. These tools include applying SNR margins to the SNR measurements, such as combining an adjacent channel interfere margin (ACIM) and/or a return loss ambiguity margin (RLAM) to the measurements.

The ACIM is additional SNR margin added to accommodate adjacent channel interference. In some embodiments, the DCM sets the ACIM as additional SNR margin in decibels (dB) as a function of interference level. In such embodiments, the DCM can use the ACIM to compensate for inaccurate measurement of the interferer. An ACIM table can provide the additional SNR margin desired with respect to SNR in a non-interfering case to compensate for the interferer transmitted by a transmitting node.

Also, a receiving node can set a bit loading profile (profile) for the desired signal that can include: bit loading information for when there is a first predetermined amount of interference from an interfere channel, bit loading information for when the interfere channel and a desired channel are from a same node, or any combination thereof. For example the profile can include bit loading information where there is significant interference from the secondary channel, and the interfere signal is transmitted from the same transmission node as the desired signal.

Also, as part of a probe report, the receiving node can distribute the ACIM table. Furthermore, the profile can also store the SNR measurements and added margins. With respect to generation of the ACIM table, the DCM can use current SNR on each channel when there is an interferer. The interferer may be any of the nodes in the network transmitting simultaneously with the desired signal on an adjacent channel. The ACIM may be calculated from a comparison of the current SNR on each channel with respective SNR found during a probe.

Regarding the RLAM, this additional SNR margin can be added to accommodate changes in the actual return loss of different nodes compared to their respective return loss when the probes were measured. The RLAM can be used to limit effects due to variation in either the primary or secondary channel's response. For example, the DCM can use the RLAM when a state of an analog front-end (AFE) of the interferer is different from its state when the probes were transmitted.

Also, in some embodiments, the DCM can use the RLAM to add margin to bit loading. Further, the DCM can set the RLAM according to a priori, such as adding the RLAM in worst-case scenarios or adding the RLAM adaptively.

Furthermore, in some embodiments, the DCM can operate in an optimal performance mode or low power consumption mode. For the most part, these modes differ by how the DCM treats AFE of non-receiving and non-transmitting nodes (idle nodes). In the optimal performance mode, the DCM activates the AFE of all idle nodes. An advantage of the optimal performance mode is that the DCM makes measurements that are more precise on actual channel responses, and neither the ACIM nor the RLAM are necessary for effective communications. As for the low power consumption mode, the DCM deactivates the AFE of all the idle nodes. The advantage of this mode is power savings at the idle nodes. However, in the low power consumption mode, the DCM should use the RLAM to compensate for differences in channel response due to AFE status change of the other nodes when SNR measurements by probes were made. Also, the ACIM can be used to improve communications in the low power consumption mode.

Figure 6:
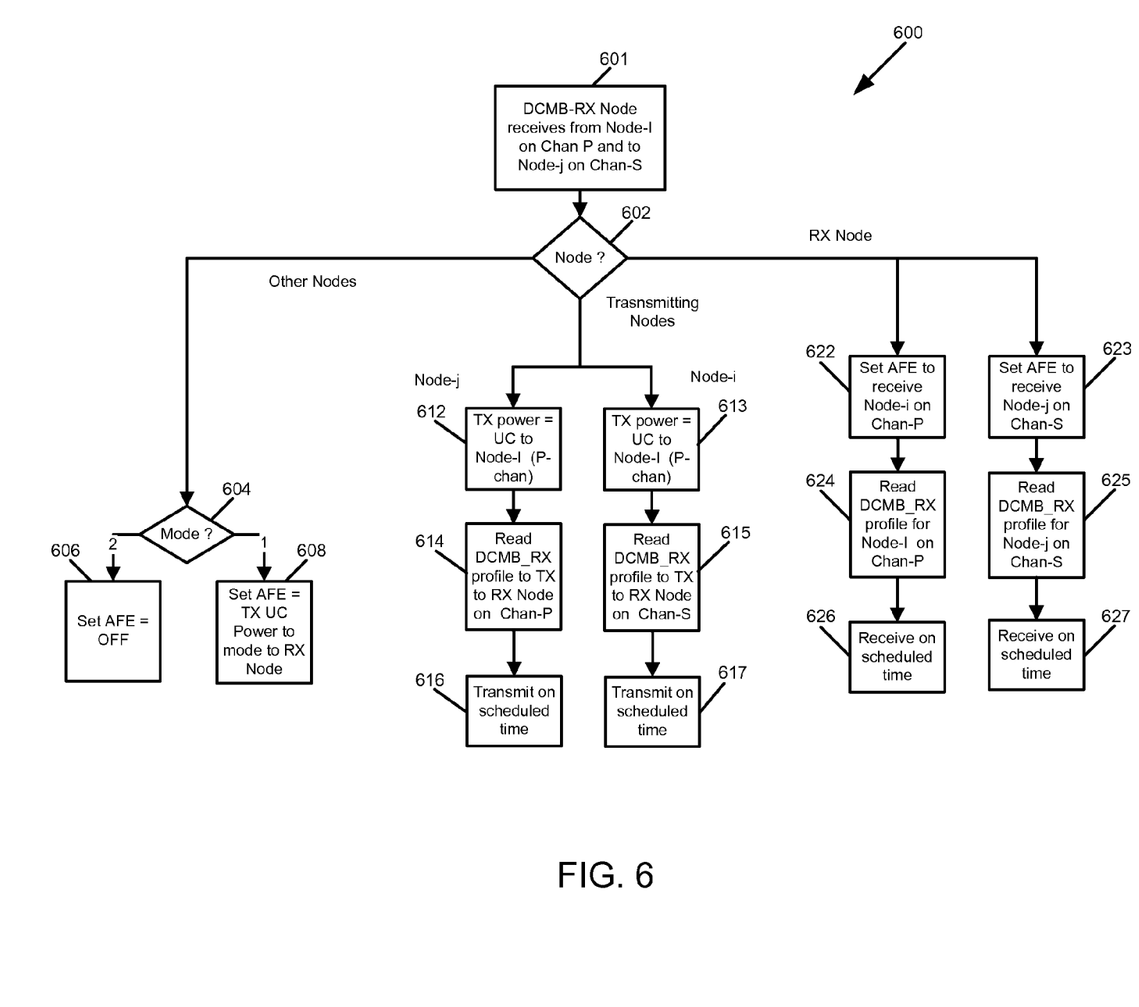
FIG. 6 is a flow chart diagram illustrating an example method for operating an example MoCA network operating in the DCMB-RX.

In FIG. 6, depicted is a flow chart diagram illustrating an example method 600 for operating an example MoCA network operating in the DCMB-RX. The method starts at 601 with a receiving node receiving two respective signals from a first transmitting node on the primary channel and a second transmitting node on the secondary channel, where the first and second node can be a bonded-channels enabled node or two single channel nodes. Next, at 602, the DCM determines which node(s) to operate.

At 604, the DCM determines whether to operate the other nodes in the optimal performance mode at 608 or the low power consumption mode at 606. Also, at 608, the DCM sets an AFE transmission gain of each of the other nodes to the transmission gain applied by a node when transmitting in the DCM when an optimized transmission power per receiving node is applied (DCM UC TX Power).

Where the DCM node selects to operate on the first transmitting node and the second transmitting node, at 612 and 613, the DCM sets a respective transmission power of each of the channels to the DCM UC TX Power. DCM UC TX Power may be transmission power applied by a DCM TX Node transmitting in DCM having an optimized transmission power per RX Node. Next, at 614 and 615, the DCM reads a respective profile for each of the primary and secondary channels of the DCMB_RX to transmit to the receiving node on each of the channels, respectively. Upon acquiring the respective profiles at the receiving node, at 616 and 617, respectively, the first and the second transmitting nodes transmit signals according to respective schedules included in the respective profiles.

Where the DCM node selects to operate on the receiving node, at 622 and 623, the DCM sets AFE to receive signals from the first transmitting node on the primary channel and to receive signals from the second transmitting node of the secondary channel, respectively. Next, at 624 and 625, the DCM reads the respective profiles for each of the primary and secondary channels of the DCMB_RX, respectively. After reading the respective profiles at the receiving node, at 626 and 627, respectively, the receiving node receives signals according to the respective schedules included in the respective profiles.

Figure 7:
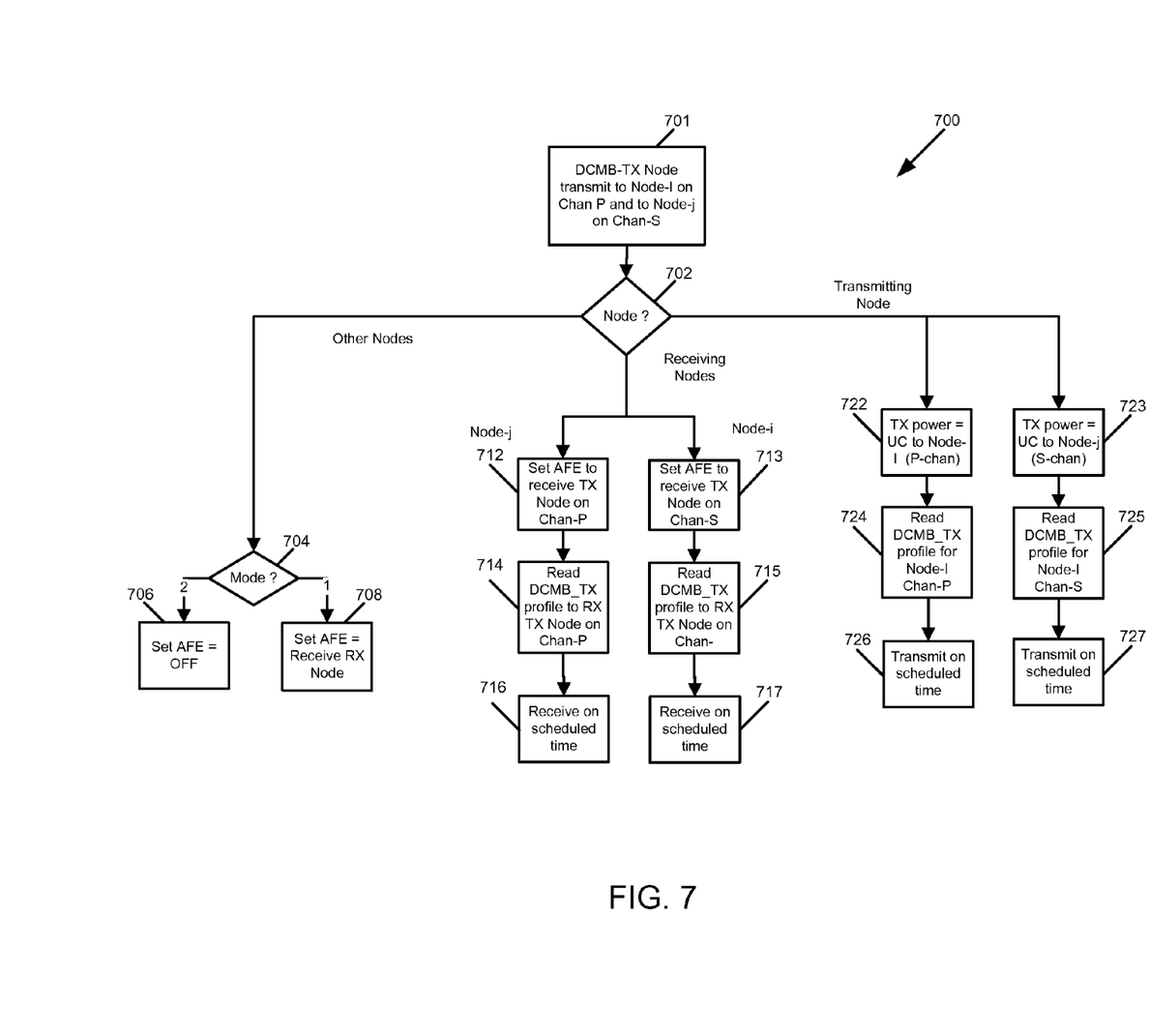
FIG. 7 is a flow chart diagram illustrating an example method for operating an example MoCA network operating in the DCMB-TX.

In FIG. 7, depicted is a flow chart diagram illustrating an example method 700 for operating an example MoCA network operating in the DCMB-TX.

The method starts at 701 with a transmitting node transmitting two respective signals to a first receiving node on the primary channel and a second receiving node on the secondary channel, where the first node and second node can be one bonded-channels enabled node or two single channel nodes. Next, at 702, the DCM determines which node(s) to operate.

Where the DCM node selects to operate on other nodes besides the receiving nodes and the transmitting node, e.g., idle nodes, the DCM then at 704 determines whether to operate the other nodes in the optimal performance mode at 708 or the low power consumption mode at 706. Also, at 708, the DCM sets a receiver gain of the AFE of each of the other nodes to receive the DCM UC TX Power of the transmitting node.

Where the DCM node selects to operate on the receiving nodes, at 712 and 713, the DCM sets respective AFEs for the first receiving node and the second receiving node to receive signals from the transmitting node on the primary channel and the secondary channel, respectively. Next, at 714 and 715, the DCM reads a respective profile for each of the primary and secondary channels of the DCMB_TX to receive from the transmitting node on each of the channels, respectively. Upon acquiring the respective profiles at the receiving node, at 716 and 717, respectively, the first and the second receiving nodes receive signals according to respective schedules included in the respective profiles.

Where the DCM node selects to operate on the transmitting node, at 722 and 723, the DCM sets a respective transmission power for each of the channels to the DCM UC TX Power. Next, at 724 and 725, the DCM reads the respective profiles for each of the primary and secondary channels of the DCMB_TX, respectively. After reading the respective profiles at the transceiving node, at 726 and 727, respectively, the transmitting node transmits signals according to the respective schedules included in the respective profiles.

In some embodiments, the DCM, DCMB-TX, DCMB-RX, and DCMS can use different types of bit loading profiles. One of the profile types, a type-1 profile, refers to bit loading of a specific interferer signal. Another type, a type-2 profile, refers to bit loading with a common, average, or any interferer. Another type, a type-3 profile, includes a SNR profile and refers to bit loading of a common/any/average interferer (or can be solely a SNR profile). The type-1 profile provides the best performance, and no additional margins are required in its creation. The type-2 profile is created by calculating bit loading with respect to SNR measured from a set of common interferers or all possible interferers. The type-3 profile is created by measuring SNR without interference from the interferer and by adjusting for a given interferer according to the ACIM Table. Also, the RLAM may be added to all profile types to account for channel impulse response variations due to return loss. The addition of RLAM depends on the mode of operation, e.g., when in the low power consumption mode, RLAM should be added. Further, for each of the profile types there is a respective probe type.

Figure 8:
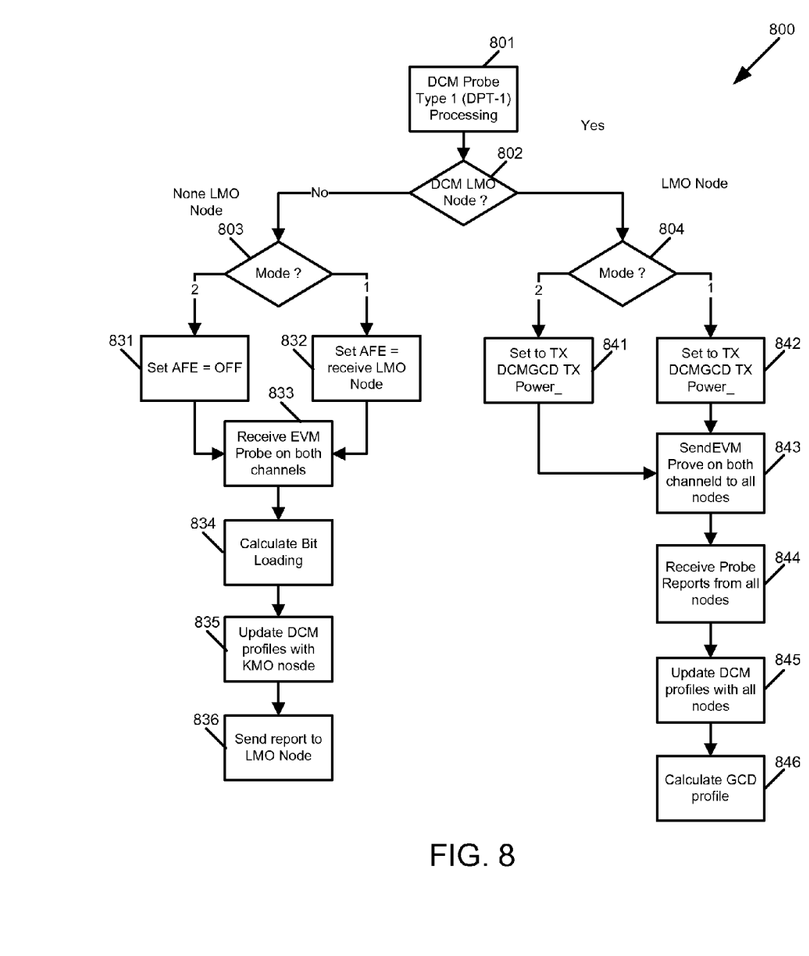
FIG. 8 is a flow chart diagram illustrating an example method for operating an example DCM error vector magnitude probe type-one (DPT-1).

In FIG. 8, depicted is a flow chart diagram illustrating an example method 800 for operating an example DCM error vector magnitude probe type-one (DPT-1). As depicted by the method 800, the DPT-1 can be transmitted by a link maintenance operation (LMO) node on the primary channel, the secondary channel, or both simultaneously. The LMO node can be a DCM capable node (a DCM LMO node) that can communicate with other DCM capable nodes. The DPT-1 corresponds to a specific interferer on a channel with a transmission power set according to a DCM configuration. Also, in the optimal performance mode, all the other DCM nodes (e.g., idle nodes) set their respective AFEs to receive the DPT-1 on both of the channels. In the low power consumption mode, all the other DCM nodes deactivate their respective AFEs for both of the channels.

The method 800 begins at 801, where it determines whether the DTP-1 is associated with a LMO node or not at 802. Where the DCM determines the DTP-1 is not associated with a LMO node, it next determines, at 803, whether the DCM is operating in the low power consumption mode or the optimal performance mode. Where the DCM determines the first scenario it deactivates one or more AFEs of the node at 831, where the DCM determines the latter scenario, the DCM sets the one or more AFEs to receive signals from a LMO node at 832. In either of the scenarios, the node receives the DPT-1 on both of the channels at 833, calculates bit loading at 834, updates a respective bit loading profile associated with the LMO node at 835, and transmits a report to a LMO node at 836.

Where the DCM determines the DTP-1 is associated with a LMO node, it next determines, at 804, whether the DCM is operating in the low power consumption mode or the optimal performance mode. Where the DCM determines the first scenario it sets the node's transmission power to a transmission power applied by a DCM transmission node when transmitting in the DCM and when a common transmission power is used to transmit to any DCM receiving nodes (DCM GCD TX Power) at 841. Where the DCM determines the latter, the DCM also sets the node's transmission power to DCM GCD TX Power at 842. In either of the scenarios, the LMO node transmits the DPT-1 on both of the channels to all other nodes at 843, receives probe reports from the all other nodes at 844, updates respective bit loading profiles for the all other nodes at 845, and calculates a bit loading profile with respect to the DCM GCD TX Power at 846.

Figure 9:
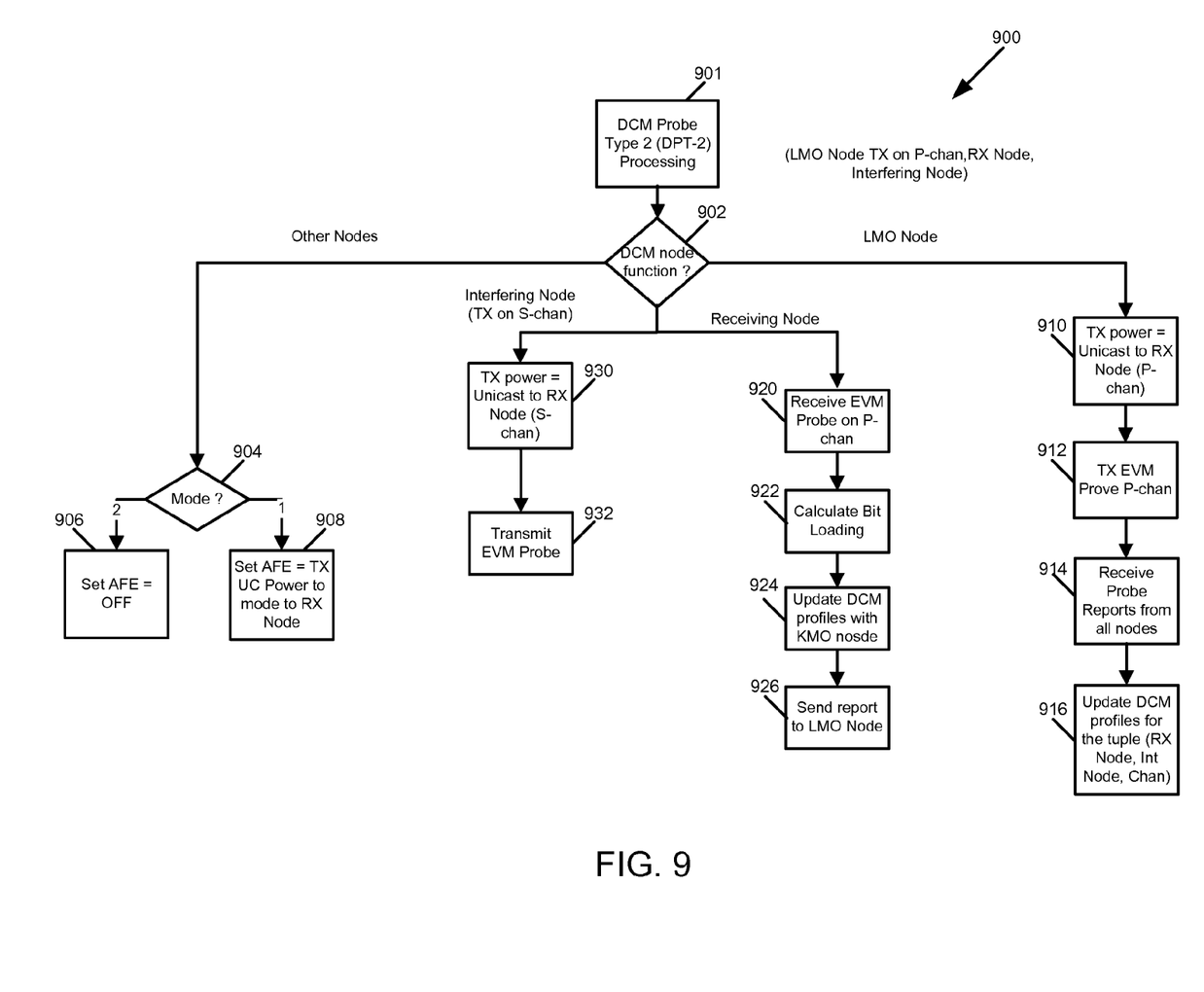
FIG. 9 is a flow chart diagram illustrating an example method for operating an example DCM error vector magnitude probe type-two (DPT-2).

In FIG. 9, depicted is a flow chart diagram illustrating an example method 900 for operating an example DCM error vector magnitude probe type-two (DPT-2), where the DPT-2 can be transmitted to the LMO node on the primary channel and by an interferer on the secondary channel. The interferer can be any other node than the LMO node. Not depicted by the method 900, the DPT-2 can be transmitted by the LMO node on the primary channel, the interferer on the secondary channel, or the LMO node on the secondary channel and the interferer on the primary channel. To illustrate DPT-2, the method 900 only depicts the DPT-2 being transmitted by the LMO on the primary channel, and the DPT-2 being transmitted by an interfering node on the secondary channel. The transmission power for DPT-2 is set according to a DCM configuration, and for each DCM receiving node this probe is repeated for all interferers or a set of most common interferers. Also, in the optimal performance mode all the other DCM nodes (e.g., idle nodes) set their respective AFEs to transmit whether transmitting or not. In the low power consumption mode, all the other DCM nodes deactivate their respective AFEs. Further, the number of DPT-2 transmitted per LMO, where N is the number of DCM capable nodes in the network, is (N−1)×(N−2)×2.

The method 900 begins at 901 with the DCM processing the DPT-2, where it determines whether the DTP-2 is associated with a LMO node, a receiving node, an interfering node, or other node (e.g., an idle node) at 902. Where the DCM determines the DTP-2 is associated with a LMO node, at 910, the DCM sets the LMO node's transmission power to the DCM UC TX Power. Then, at 912, the LMO node transmits the DPT-2 via the primary channel to all other nodes, and then it receives probe reports from the all other nodes at 914. Next, at 916, the LMO node updates bit load profiles for any receiving node, interfering node, and channel (primary channel or secondary channel).

Where the DCM determines the DTP-2 is associated with a receiving node, at 920, the receiving node receives the DPT-2 via the primary channel. Then the receiving node or the DCM calculates bit loading at 922, updates respective bit loading profiles with the LMO node at 924, and transmits a report to the LMO node at 926.

Where the DCM determines the DTP-2 is associated with an interfering node, at 930, the DCM sets the interfering node's transmission power to the DCM UC TX Power associated with the receiving node, and then, at 932, the interfering node transmits the DPT-2 via the secondary channel. Also, where the DCM determines the DTP-2 is associated with another type of node (e.g., an idle node), at 904, the DCM determines whether to operate the other type of node in the optimal performance mode at 908 or the low power consumption mode at 906. Also, at 908, the DCM sets a transmission gain of the AFE to the DCM UC TX Power associated with the receiving node.

Figure 10:
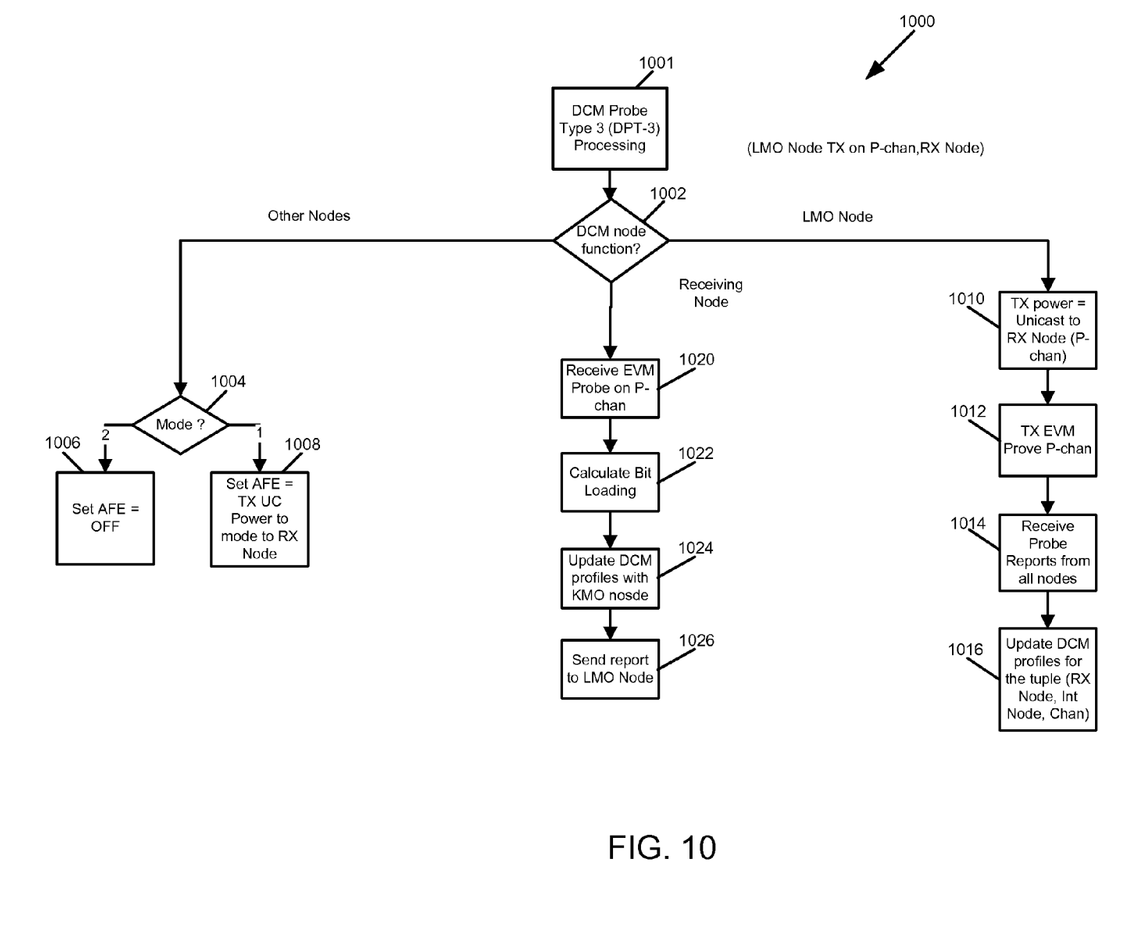
FIG. 10 is a flow chart diagram illustrating an example method for operating an example DCM error vector magnitude probe type-three (DPT-3).

In FIG. 10, depicted is a flow chart diagram illustrating a method 1000 for operating an example DCM error vector magnitude probe type-three (DPT-3), where the DPT-3 can be transmitted by the LMO node to the RX node on the primary channel or on the secondary channel. Not depicted by the method 1000, the DPT-3 can be transmitted by the LMO node on the primary channel, or on the secondary channel. The transmission power for DPT-3 is set according to a DCM configuration with no interferer accounted for. Also, in the optimal performance mode all the other DCM nodes (e.g., idle nodes) set their respective AFEs to transmission gain associated with the receiving node whether transmitting or not. In the low power consumption mode, all the other DCM nodes deactivate their respective AFEs. Further, the number of DPT-3 transmitted per LMO, where N is the number of DCM capable nodes in the network, is (N−1)×2.

The method 1000 begins at 1001 with the DCM processing the DPT-3, where it determines whether the DTP-3 is associated with a LMO node, a receiving node, or other node (e.g., an idle node) at 1002. Where the DCM determines the DTP-3 is associated with a LMO node, at 1010, the DCM sets the LMO node's transmission power to the DCM UC TX Power associated with the receiving node. Then, at 1012, the LMO node transmits the DPT-2 via the primary channel to all other nodes, and then it receives probe reports from the all other nodes at 1014. Next, at 1016, the LMO node updates bit load profiles for any receiving node, and channel. Also, where the DCM determines the DTP-3 is associated with a receiving node, at 1020, the receiving node receives the DPT-2 via the primary channel. Then the receiving node or the DCM calculates bit loading at 1022, updates respective bit loading profiles with the LMO node at 1024, and transmits a report to the LMO node at 1026. Further, where the DCM determines the DTP-3 is associated with another type of node (e.g., an idle node), at 1004, the DCM determines whether to operate the other type of node in the optimal performance mode at 1008 or the low power consumption mode at 1006. Also, at 1008, the DCM sets a transmission gain of the AFE to the DCM UC TX Power associated with the receiving node.

The methods, devices, and logic described herein can be implemented in many different ways in many different combinations of hardware, software or both hardware and software. For example, all the nodes of the abovementioned networks operating in the DCM can include circuitry in a controller, a microprocessor, or an application specific integrated circuit (ASIC), or can be implemented with discrete logic or components, or a combination of other types of circuitry. All or part of the logic can be implemented as instructions for execution by a processor, controller, or other processing device and can be stored in a machine-readable or computer-readable medium such as flash memory, random access memory (RAM) or read only memory (ROM), flash memory, erasable programmable read only memory (EPROM) or other machine-readable medium such as a compact disc read only memory (CDROM), or magnetic or optical disk. In some embodiments, the methods, devices, and logic described herein can be implemented on existing MoCA 2.0 cores with firmware modifications.

While various embodiments of the invention have been described, it will be apparent that many more embodiments and implementations are possible within the scope of the invention. Accordingly, the invention is not to be restricted except in light of the attached claims and their equivalents.

What is claimed is:
1. A system, comprising:
 a network node configured to:

operate in a dual channel mode of operation for a network, wherein the dual channel mode of operation (DCM) provides throughput associated with channel bonding; and probe two single channel nodes to determine respective communication parameters between each single channel node and the network node, wherein the network is a Multimedia over Coax Alliance (MoCA) network configured to channel bond and wherein the network node and the two single channel nodes are MoCA compatible devices; and hardware of the network node configured to configure the two single channel nodes to operate in the DCM with the network node, according to the probe of the two single channel nodes.

2. The system of claim 1, wherein the DCM comprises a MoCA dual channel mode.

3. The system of claim 1, wherein the DCM comprises a mode of operation in which at least three different nodes of the network are each communicating simultaneously with one or two transmitter nodes and one or two receiver nodes, and wherein each of the at least three different nodes is configured to be one of the transmitter nodes or one of the receiver nodes.

4. The system of claim 1, wherein the DCM comprises simultaneous transmissions over two bonded channels and wherein the simultaneous transmissions over the two bonded channels comprises transmissions between a bonded-channels-enabled node and two single channel nodes.

5. The system of claim 1, wherein the DCM comprises simultaneous transmissions over two bonded channels, and wherein the simultaneous transmissions over two bonded channels comprises transmissions between two pairs of single channel nodes.

6. The system of claim 1, wherein the DCM comprises a single transmitter node that transmits on two channels, and a single receiver node that receives on the two channels, wherein the single transmitter node and the single receiver node comprise one or more nodes of the network.

7. A system, comprising:
a network node configured to provide a dual channel mode of operation for a network, wherein the dual channel mode of operation (DCM) provides throughput associated with channel bonding, and wherein the DCM compensates for a first transmission of a first channel interfering with a second transmission of a second channel by probing a signal-to-noise ratio (SNR) of the second channel, wherein the SNR is based on previous transmissions on the second channel occurring under the DCM; and a non-transitory computer readable medium of the network node configured to configure two single channel nodes to operate in the DCM with the network node, according to the probing of the SNR of the second channel, wherein the network is a Multimedia over Coax Alliance (MoCA) network configured to channel bond and wherein the network node and the two single channel nodes are MoCA compatible devices.

8. The system of claim 7, wherein the DCM comprises margins to compensate for inaccurate probes of the SNR, wherein the margins include an adjacent channel interfere margin (ACIM), a return loss ambiguity margin (RLAM), or a combination thereof.

9. The system of claim 8, wherein the DCM comprises setting the ACIM as additional SNR margin in decibels as a function of interference level.

10. The system of claim 9, wherein the DCM comprises selecting an ACIM from a table of ACIMs comprising ACIMs with respect to the SNR in a non-interfering case.

11. The system of claim 8, wherein the RLAM is added to additional SNR margin to accommodate for differences in actual return loss of the network node with respect to return loss measured by one of the probes.

12. The system of claim 8, wherein the RLAM is added according to a priori or is added adaptively.

13. A system, comprising:
a network node configured to provide a dual channel mode of operation (DCM) for a network, wherein the DCM provides throughput associated with channel bonding, and wherein the DCM comprises a receiving node that sets a bit loading profile for a desired signal that includes: bit loading information for when there is a first predetermined amount of interference from an interfere channel, bit loading information for when the interfere channel and a desired channel are from a same node, or any combination thereof; and a non-transitory computer readable medium of the network node configured to configure two single channel nodes to operate in the DCM with the network node, according to at least part of the bit loading profile, wherein at least one of the two single channel nodes is the receiving node, and wherein the network is a Multimedia over Coax Alliance (MoCA) network configured to channel bond and wherein the network node and the two single channel nodes are MoCA compatible devices.

14. The system of claim 13, wherein the DCM comprises a performance driven sub-mode of operation and a low power consumption sub-mode of operation, wherein these two sub-modes of operation differ by treatment of a state of an analog front-end (AFE) of an idle node, wherein the performance driven sub-mode of operation activates the AFE of the idle node, and wherein the low power consumption sub-mode of operation deactivates the AFE of the idle node.

15. The system of claim 14, wherein during the low power consumption sub-mode of operation the DCM compensates for a first transmission of a first channel interfering with a second transmission of a second channel by probing a signal-to-noise ratio (SNR) of the second channel, wherein the SNR is based on previous transmissions on the second channel occurring under the DCM, and wherein the DCM combines a return loss ambiguity margin to the SNR to compensate for inaccurate probes of the SNR.

16. The system of claim 13, wherein the DCM comprises a MoCA dual channel mode.

17. The system of claim 13, wherein the DCM comprises a mode of operation in which at least three different nodes of the network are each communicating simultaneously with one or two transmitter nodes and one or two receiver nodes, and wherein each of the at least three different nodes is configured to to be one of the transmitter nodes or one of the receiver nodes.

18. The system of claim 13, wherein the DCM comprises margins to compensate for inaccurate probes of signal-to-noise ratio (SNR), wherein the margins include an adjacent channel interfere margin (ACIM), a return loss ambiguity margin (RLAM), or a combination thereof, and wherein the RLAM is added to additional SNR margin to accommodate for differences in actual return loss of the network node with respect to return loss measured by one of the probes.

19. The system of claim 1, wherein the DCM comprises margins to compensate for inaccurate probes of signal-to-noise ratio (SNR), wherein the margins include an adjacent channel interfere margin (ACIM), a return loss ambiguity margin (RLAM), or a combination thereof, and wherein the RLAM is added to additional SNR margin to accommodate for differences in actual return loss of the network node with respect to return loss measured by one of the probes.

* * * * *